(12) United States Patent
Nilsson

(10) Patent No.: US 6,956,382 B2
(45) Date of Patent: Oct. 18, 2005

(54) ISOLATION CIRCUIT

(75) Inventor: Valter Nilsson, Hovås (SE)

(73) Assignee: Saab Rosemount Tank Radar AB, Gothenburg (SE)

(*) Notice: Subject to any disclaimer, the term of this patent is extended or adjusted under 35 U.S.C. 154(b) by 0 days.

(21) Appl. No.: 10/301,825

(22) Filed: Nov. 22, 2002

(65) Prior Publication Data
US 2004/0100281 A1 May 27, 2004

(51) Int. Cl.[7] .............................................. G01R 27/04
(52) U.S. Cl. ...................................... 324/644; 324/637
(58) Field of Search .............................. 324/637, 639, 324/644; 702/57; 73/290 R

(56) References Cited

U.S. PATENT DOCUMENTS

| | | | |
|---|---|---|---|
| 5,365,178 A | * 11/1994 | Van Der Pol | 324/644 |
| 5,416,723 A | 5/1995 | Zyl | |
| 5,672,975 A | 9/1997 | Kielb et al. | |
| 5,847,567 A | * 12/1998 | Kielb et al. | 324/642 |
| 6,014,100 A | 1/2000 | Fehrenbach et al. | |
| 6,373,261 B1 | * 4/2002 | Kielb et al. | 324/644 |
| 6,445,192 B1 | * 9/2002 | Lovegren et al. | 324/644 |
| 2002/0154052 A1 | 10/2002 | Fehrenbach et al. | 342/124 |
| 2003/0154783 A1 | 8/2003 | Koernle | 73/291 |

FOREIGN PATENT DOCUMENTS

| | | |
|---|---|---|
| DE | 197 07 139 | 8/1998 |
| DE | 199 49 985 | 5/2001 |
| EP | 1 072 870 | 1/2001 |
| EP | 1 108 992 | 6/2001 |
| WO | WO 01/88644 | 11/2001 |

OTHER PUBLICATIONS

PCT International Search Report.

* cited by examiner

Primary Examiner—Vincent Q. Nguyen
(74) Attorney, Agent, or Firm—Westman, Champlin & Kelly, P.A.

(57) ABSTRACT

A radar level gauge using microwaves coupable to a two-wire process control loop for measuring level of a product in a tank. A microwave antenna unit is directable into the tank. A low power microwave source sends a microwave signal through the antenna unit into the tank. A low power microwave receiver receives a reflected microwave signal from a surface of the product in the tank. Measurement circuitry coupled to the source and receiver initiates transmission of the microwave signal and for determining product level based upon the received signal. Output circuitry coupled to the two-wire process control loop transmits information related to product level over the loop. Power supply circuitry coupled to the two-wire process control loop receives power from the loop being the sole source of power for the low power microwave source, the low power microwave receiver, the measurement circuitry and the output circuitry in the radar level gauge. An isolation circuit non-conductively transfers power from the loop to the power supply circuitry and non-conductively transmits the information between the output circuitry and the loop.

17 Claims, 3 Drawing Sheets

ISOLATION CIRCUIT

TECHNICAL FIELD

The present invention relates to level measurement in industrial processes, wherein the invention is used for measurement of product level in a storage tank of the type used in industrial applications using a microwave level gauge. More specifically, the present invention relates to a device and a method for non-conductive isolation of the microwave level gauge from a feeding line.

Instrumentation for the measurement of product level (either liquids or solids) in storage vessels is evolving from contact measurement techniques, such as tape and float, to non-conduct techniques. One technology that helds considerable premise is based on the use of microwaves. The basic premise involves transmitting microwaves towards the product surface and receiving reflected microwave energy from the surface. The reflected microwaves are analyzed to determine the distance that they have traveled. Knowledge of the distance traveled allows determination of the product level.

One standard in the process control industry is the use of 4–20 mA process control loops. Under this standard a 4 mA signal represents a zero reading and a 20 mA signal represents a full scale reading. Further, if a transmitter in the field has sufficiently low power requirements, it is possible to power the transmitter using current from the two-wire loop. However, microwave transmitters for level gauging in the process control industry have always required a separate power source. These microwave transmitters were large and their operation required more power than could be delivered using 4–20 mA standard. Thus typical prior art microwave transmitters for level gauging required additional wiring into the field to provide power to the unit. This additional wiring was not only expensive, but also was a cause of potential failure.

The document U.S. Pat. No. 5,672,975 discloses an arrangement for providing power to a radar level gauge and for transmitting level information provided by the radar level gauge by means of a two-wire process control loop. The term radar level gauge is here used for a unit including an antenna unit, a microwave transmitter, a receiver, transmitter and receiver circuits and circuits for calculating a measured level.

A two-wire radar level gauge is distinguished by that it is being supplied by power and at the same time communicating analog and digital information through the same wire. A prior art two-wire radar level gauge can be coupled as is shown in FIG. 1. A voltage source 1 is supplying the radar level gauge 2 with power through the two-wire loop 3. A barrier 4 for transient protection and for containing an EMC-filter may be included between the gauge and the loop. The gauge is conveying an actual measured value to a control unit by setting a current proportional to the level value measured. This current can be set in the interval 4–20 mA.

In that it will be possible to span the loop current over the whole interval, the internal power consumption of the radar level gauge must be lower or equivalent to 4 mA. This lowest limit is valid for a measured value which is represented by the lowest value to be conveyed by the loop.

Equipment which is to be located in explosive environments is subjected to authority demands. It is common that equipment is then designed and certified as "explosive safe" (Eexd) or "intrinsic safe" (Eexia).

Safety against explosion (d) is guaranteed, in general, by use of a casing, which complies with certain requirements. Such equipment may be powered via a barrier to limit the energy which is feeded out to the wires and to the gauge. Intrinsic safe means that the construction in itself is designed in such a way, that electric energy is not available in a sufficient amount to generate a spark, which can set fire to an explosive gas surrounding the construction. From practical reasons, this means that there is a barrier at the entrance to those parts being classified as intrinsic safe. This is examplified by either a barrier 4 or a barrier 9.

For a radar level gauge, parts of the equipment which must be located inside, for example, an oil container have to be intrinsic safe. As a result there is required a barrier which limits, with high security, energies possibly available at wave guides and antenna parts.

It is common that the electronic circuits of the radar level gauge is galvanically (conductively) connected to the 4–20 mA loop as in FIG. 1. This means that the electronic circuits 6 of the gauge must be insulated from a framework connected to the gauge and a casing enclosing the gauge to avoid influence from currents to ground. The interface between the electronic circuits and a wave guide connection 7 to an antenna unit 8 must be galvanically (non-conductive in term of DC-currents) insulated. To comply with security regulations a lot of requirements are set, which means, as an example, that a specific security distance is required between all electric circuits and the surrounding mechanical parts. Further, the amount of energy which is stored in capacitive and inductive components must be limited. To solve some of these difficulties the insulation may be improved by means of supplementary insulation or by means of founding. An additional electronic barrier 9 may be included at the input to the loop 3.

The present solutions as discussed involve great design difficulties when requirements related to function, EMC, and security should be met with within one and the same design of a radar level gauge. To achieve a good function of the gauge it is very important how the installation is performed, if shielded or unshielded cables are used, how the location of the leads are done, the connection to ground/framework of the voltage supply.

Further, it is very sensitive how the voltage supply and other equipment connected to the gauge is referred to ground.

Document EP 1 108 992 A1 discloses a level gauge where the sensor is of A type other than based on microwaves. The sensor is separated galvanically from an evaluation unit for arriving at some of the objects mentioned above. The galvanical separation is achieved by means of an optical fibre between a data converter and an evaluation unit for communication of data beween these units. It is not described or showed how the power supply is performed. As it is not possible to transfer the required power via an optical line to a radar transmitter, it would be necessary to use additional wires for the power supply if the disclosed solution would be used on a radar level gauge application, which means that this disclosure is not possible to apply on a radar level gauge powered via a two-wire control loop. It is further not shown in the disclosure if a 4–20 mA control loop is used for powering the sensor.

The object of the invention is to provide an isolation circuit for a radar level gauge powered via a two-wire control loop for non-conductively separating the radar level gauge from said loop.

BRIEF DESCRIPTION OF THE INVENTION

According to one aspect of the invention, there is presented a two-wire powered radar level gauge having an insulation circuit with the features of the independent device claim.

According to a second aspect of the invention, there is presented a method for radar level gauging having the features of the independent method claim.

The invention discloses an isolation circuit which makes it possible to galvanically insulate the radar level gauge from a two-wire loop powering the gauge. This means that all electronic circuits can be referred/connected to ground (0V). As a result, the radar level gauge can be built in a more structured and clear way, whereby the electrical and mechanical design is made easier. Further, the construction of the gauge can be more adapted do design changes.

The isolation circuit included in the level gauging system is transforming the voltage from the loop to an over-voltage protected and current limited low feed voltage to the electric circuits of the gauge. The isolation circuit can at the same time be supervised to load the loop with currents between 4 and 20 mA for forwarding data collected by the gauge. Also process signals (such as HART signals) from and to the gauge are handled by the circuit and transmitted in both directions.

Great advantages related to design of the radar level gauge circuits are achieved when substantially all security aspects can be handled and concentrated to only one circuit. All other electronics, which is made intrinsic safe are given the same prerequisites.

Probabilities to improve EMC performance and to decrease the dependency of how the voltage supply is grounded are other advantages.

A list of advantages with the provided solution is:

Galvanical insulation makes the radar level gauge independent of how the voltage supply is referred to ground.

Galvanical insulation provides greater possibilities to improve EMC performances due to better insulation in relation to ground.

Low voltages and frame connected electric circuits reduce the necessity of extraordinary insulations measures.

Low voltage and frame connected electric circuits increase the possibilities to comply with security demands also with a higher degree of packing density of the electronics.

Low and current limited voltage increases the possibilities to use bigger capacitances for reduction of disturbances or for enlarging the energy reservoirs.

Frame connection of the electronics makes the necessity of insulation of the wave guide to the antenna in relation to the frame superfluous.

The interface between the electronics of the level gauge and the loop can be simpler. A barrier against the loop may be located in a separate circuit or block. The electronics fed from the isolation circuit is given the same prerequisites, which leads to a greater freedom in designing the circuits of the level guage.

The combination of an insulated loop interface with a barrier at the output implies low losses, whereby the same circuit can be used for both explosion safe and intrinsic safe designs.

EMBODIMENTS OF THE INVENTION

Examples of embodiments of the invention are here described with support of the enclosed figures.

Figure 1:
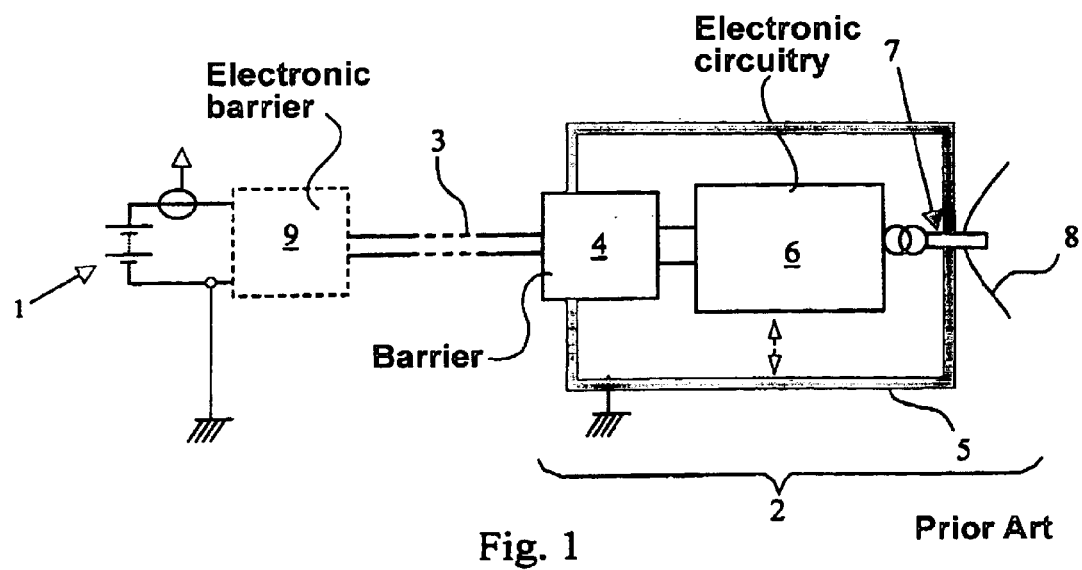
FIG. 1 shows a prior art two-wire radar level gauge.
Figure 2:
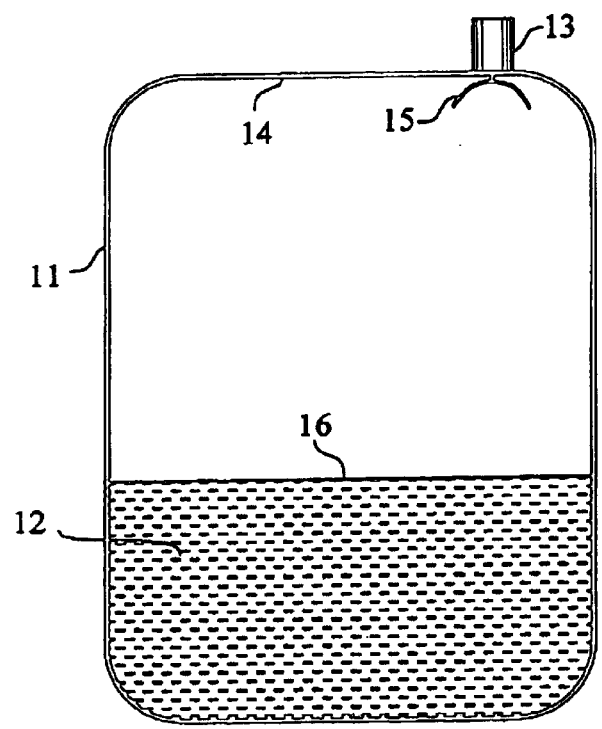
FIG. 2 schematically shows an example of a radar level gauging system for determining the level of the surface of a product in a tank.

An application of a radar level gauge is shown in FIG. 2. A tank 11 is used for storing a product 12. The product may be such as oil, refined products, chemicals and liquid gas, or may be a material in powder form. A radar 13 is attached to the roof 14 of the tank 11. A microwave beam is transmitted from the radar via an antenna 15 at the interior of the tank. The transmitted beam is reflected from the surface 16 of the product and is received by the antenna 15. By means of a comparison and evaluating of the time lap between transmitted and reflected beam in a measuring and controlling unit, a determination of the level of the product surface 16 in a known manner is performed. The microwave may be transmitted from the antenna a free radiated beam or via a wave guide (not shown), which communicates with the product. The radar level gauge as shown in FIG. 2 is only used as one example.

Figure 3:
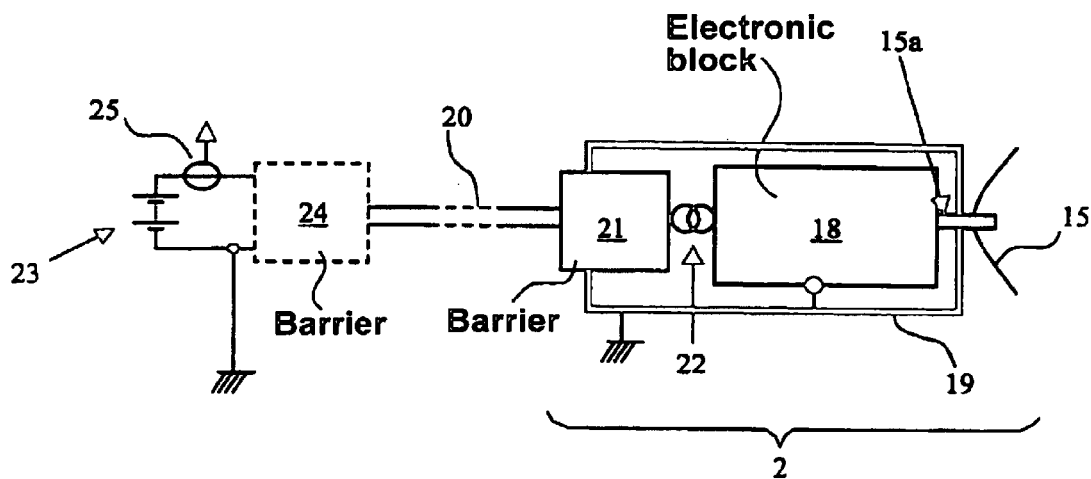
FIG. 3 shows a schematic view of a radar level gauge according to the invention.

The location of the isolation circuit in a level gauging system is illustrated in FIG. 3. The radar level gauge unit is referred to by 2. The antenna 15 is connected via a microwave transmission line 15a to the electronic block 18 containing the radar transmitter, the radar receiver, the measurement circuitry and the output circuitry. The electronic block 18 is housed in a casing 19 which is connected to the ground. As the level gauge is used on a tank 11 the casing 19 is connected to the frame of the tank 11. Also illustrated in the figure is that the electronics of the block 18 can be connected to ground, which means connected to the casing 19. The electronic block 18 of the radar level gauge is connected to the two-wire loop 20 over a transient protection and EMC-filter barrier 21, which in this embodiment is located at the input to the radar level guage as a wall entrance through-connection of the casing 19. According to the invention there is provided an isolation circuit 22 between said barrier and the electronic block 18 of the radar level gauge. Power to the radar level gauge is provided by a voltage supply 23 feeding the two-wire loop via a second barrier 24 ir required to render the feeding line intrinsic safe. In the loop there is further provided display means 25 for showing the value of the level of the product in the tank, wherein said value is based on a reading of the current in the loop 20.

Figure 4:
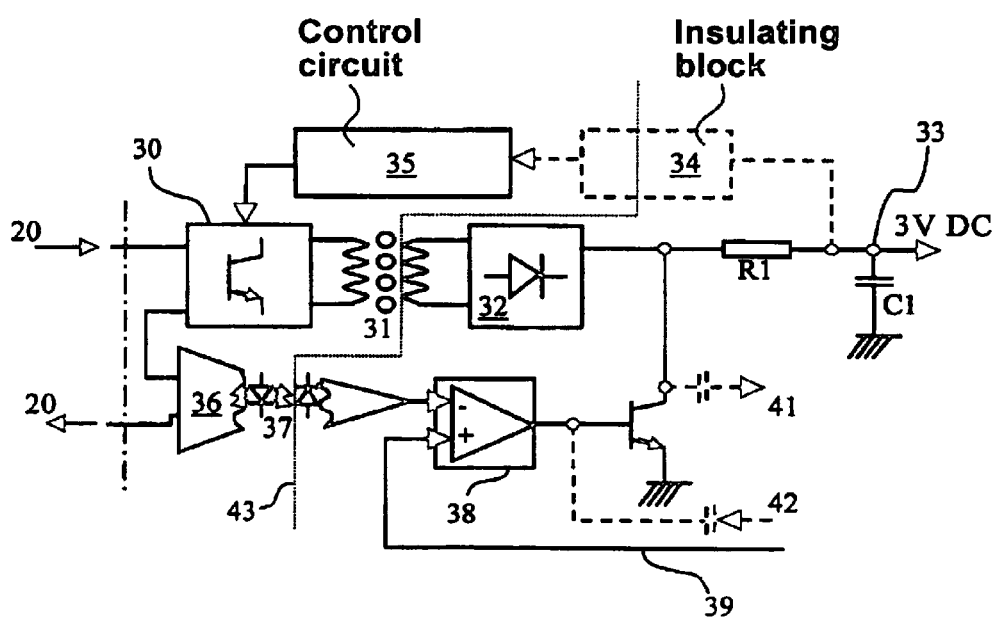
FIG. 4 shows an embodiment of the invention where the output voltage of a DC/DC-converter included in the isolation circuit is stabilized by a measure of the voltage on the secondary side of the DC/DC-converter for use of the measured value in a control signal for the converter.

One embodiment of the isolation circuit 22 according to the invention is depicted in FIG. 4. In this embodiment the loop current is forwarded to the input of a transistor switch 30 controlling the voltage over the primary side of a transformer 31. The power delivered from the loop is transformed to the secondary side of the transformer 31. A rectifier 32 is provided on said secondary side for delivering a regulated constant voltage at the output 33 of the isolation circuit. Said voltage output at 33 is used for power supply of the radar level gauge. The level of the voltage is measured at said output 33 and forwarded via a galvanically insulating block 34 to a control circuit 35, which is regulating the voltage by means of controlling the transistor switch 30 to keep the voltage at the output 33 at a constant level. A filter comprising the diode D1 and the capacitor C1 filters out the ac-components of the voltage at output 33. The filter is located after a serial resistance R1 of the output voltage branch.

The loop current passing the primary side of the transformer 31 is further flowing through a loop current measuring circuit 36. By opto-coupling means 37 the actual value of the loop current is transmitted to a comparator 38, where the actual value of the loop current is compared to the desired value of the loop current introduced by a loop current control signal 39 coming from the output circuitry of the radar level gauge and thus containing information about the value measured by the gauge. The deviation between the actual current and the desired current is delivered from the comparator 38 to the gate of a shunt transistor 40 coupled between the output of the secondary side of transformer 31 and ground, whereby said deviation controls the current flowing through the loop. Communication signals containing control and status information can be superposed on the loop current. This information can be output at 41 (for example to a HART-modem connected to the measurement circuitry) and input to the loop at 42.

The non-conductively isolation is thus achieved-as the loop and the radar level gauge by use of the shown embodiment are separated from each other in DC-terms along the dotted line 43.

Figure 5:
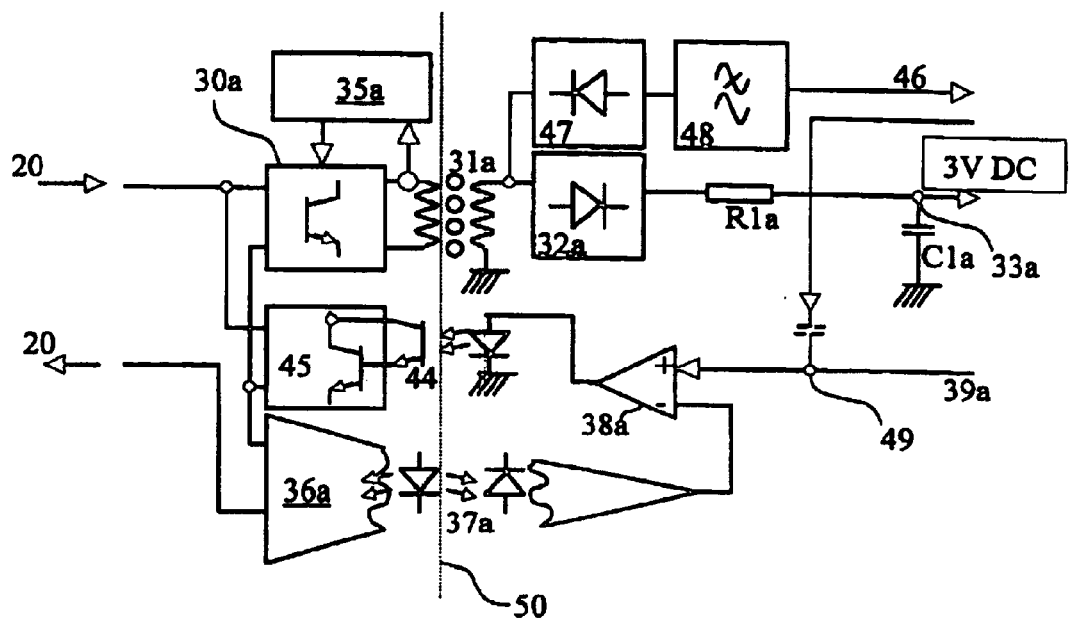
FIG. 5 shows a preferred embodiment of the invention where the output voltage of a DC/DC-converter included in the isolation circuit is stabilized by an indirect measure of the voltage on the primary side of the DC/DC-converter for use of the measured value in a control signal for the converter.

A preferred embodiment of the isolation circuit 22 is shown in FIG. 5. Also in this embodiment the loop current is forwarded to the input of a transistor switch 30a controlling the voltage over the primary side of a transformer 31a. The power delivered from the loop is transformed to the secondary side of the transformer 31a. A rectifier 32a is provided on said secondary side for delivering a regulated constant voltage at the output 33a of the isolation circuit 22. Said voltage output at 33a is used for power supply of the radar level gauge. The level of the voltage on the secondary side of the transformer 31a is in this embodiment measured on the primary side of the transformer 31a. This is possible as changes of the voltage and current on the secondary side are also mirrored on the primary side of the transformer 31a. The measured level of the signal on the primary side is sent to a control circuit 35a, which is regulating the voltage by means of controlling the transistor switch 30a to keep the voltage at the output 33a at a constant level. A filter comprising the diode D1a and the capacitor C1a filters out the ac-components of the voltage at output 33a. The fitter is located after a serial resistance R1a of the output voltage branch.

The loop current passing the primary side of the transformer 31a is further flowing through a loop current measuring circuit 36a. By opto-coupling means 37a the actual value of the loop current is transmitted to a comparator 38a, where the actual value of the loop current is compared to the desired value of the loop current introduced by a loop current control signal 39a coming from the output circuitry of the radar level gauge and thus containing information about the value measured by the gauge. The deviation between the actual current and the desired current is delivered from the comparator 38a by means of second opto coupling means 44 to the gate of a shunt transistor 45. This shunt transistor 45 is coupled in parallel to the transistor switch 31a such that a minimum current of 3,5 mA passes said transistor switch 30a and that a current in the interval 3,5 and 20 mA Is flowing through the shunt transistor 45. The loop current control signal 39a is thus by means of the control of the gate of the shunt transistor 45 controlling the loop current. Communication signals can contain control and status information superposed on the loop current as stated. This information can be outpot at conduit 46 (for example to a HART-modem connected to the measurement circuitry) which is including a blocking rectifier 47 and a signal filter 48 and connected to the output of the secondary side of the transformer. The return communication signals may be transmitted back to the loop by adding the signal to the loop control signal 39a on the secondary side of the isolation circuit at point 49.

The non-conductively isolation is thus achieved by the isolation circuit as the loop and the radar level gauge by use of the shown embodiment are separated from each other in DC-terms along the dotted line 50.

In brief, the circuit illustrated in FIG. 5 presents a switched DC/DC-converter (a "Flyback-converter") which convert, transform, rectify and control a galvanically insulated DC-voltage (~3V) from a loop to the gauging electronics. The circuits of the DC/DC-converter is designed and dimensioned to limit the amount of energy that can be transferred to the gauge. The transformer of the converter may further be dimensioned to comply with air- and creep distances and serving as a protective transformer, whereby the safety barrier can be made simpler. The voltage is stabillsed/controlled by PWM- or PFM-control of the converter. The output voltage is indirectly measured in that the primary voltage of the transformer is coupled to the control circuit. This solution reduces the number of interfaces between the primary and secondary side of the isolation circuit 22.

Figure 6:
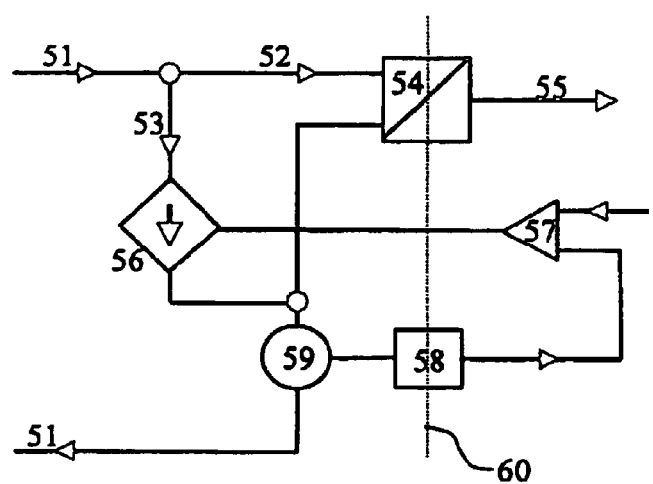
FIG. 6 shows a block diagram according to a preferred embodiment of the invention.

On a higher level the embodiment described in FIG. 5 may be illustrated by only a few blocks as depicted in FIG. 6. In this figure the loop is referred to by 51. The loop current is divided into two branches, one portion 52 is lead through a DC/DC-converter 54 having an output 55. The other portion 53 of the loop current is let through a current generator 56. The current generator 56 controls the current through the loop, whereby said current is set by a comparator 57, which gets information about actual value of the current delivered through opto coupling means 58 from loop current measuring means 59. To the comparator a desired current value is sent from the gauge, whereby the comparator can set the current by controlling the current generator. The circuit is divided into two parts along a division line 60, in which the primary part to the left of the line is non-conductively separated from the secondary part to the right of the line 60.

What is claimed is:

1. A radar level gauge coupleable to a two-wire process control loop for measuring level of a product in a tank comprising:

a microwave antenna unit directable into a tank, a low power microwave source for sending a microwave signal through the antenna unit into the tank, a low power microwave receiver for receiving a reflected microwave signal from a surface of the product in the tank, measurement circuitry coupled to the source and receiver for initiating transmission of the microwave signal and for determining product level based upon the received signal, output circuitry coupled to the two-wire process control loop for transmitting information related to product level over the loop, power supply circuitry coupled to the two-wire process control loop for receiving power from the loop being the sole source of power for the low power microwave source, the low power microwave receiver, the measurement circuitry and the output circuitry in the radar level gauge, an isolation circuit for non-conductively transferring power from the loop to the power supply circuitry and for the non-conductively transmitting said information between the output circuitry and said loop and said transferring of power from the loop to the power supply circuit performed by means of an inductive coupling device.

2. A radar level gauge according to claim 1, wherein the process control loop is a 4–20 mA process control loop.

3. A radar level gauge according to claim 1, wherein said inductive coupling device is a transformer.

4. A radar level gauge according to claim 3, wherein the isolation circuit comprises a first optical link for transmitting said information by means of light signals.

5. A radar level gauge according to claim 1, wherein the isolation circuit comprises a second optical link for transferring communication signals superposed on a loop current between the loop and the measurement circuitry.

6. A radar level gauge according to claims 4 or 5, wherein the first and second optical links includes at least one opto coupling device.

7. A radar level gauge according to claim 1, wherein the isolation circuit comprises a DC/DC-converter for transfer of power from the loop to the radar level gauge, a current measuring unit for measuring the loop current, a current generator and a comparator for controlling the loop current by control of the current generator in dependence of a deviation between the measured loop current and a desired loop current determined in the measurement circuitry.

8. A radar level gauge according to claim 7, wherein the DC/DC-converter comprises a transformer for non-conductively transferring power from the loop to the power supply circuitry.

9. A radar level gauge according to claim 7, wherein the isolation circuit comprises a controlled switch for generating an ac-voltage at a primary side in the DC/DC-converter and for control of the voltage at an output of the DC/DC-converter by means of a feedback signal.

10. A radar level gauge according to claim 9, wherein the isolation circuit comprises a control circuit for measuring the voltage output from the DC/DC-converter and for sending a control signal as said feedback signal to said controlled switch for setting the DC/DC-converter output voltage to a predetermined constant voltage level.

11. A radar level gauge according to claim 10, wherein the isolation circuit comprises a measured point on the primary side of said transformer for measuring the voltage prevailing at the output of the DC/DC-converter for use as said control signal.

12. A radar level gauge according to claim 1, wherein the isolation circuit comprises a loop current measuring circuit for transmitting an actual value of the loop current by means of first optical coupling devices to a comparator for determining in said comparator a deviation between said actual loop current and a desired loop current received from the measured circuitry.

13. A radar level gauge according to claim 12, wherein the isolation circuit comprises a current shunt which is setting the loop current to the desired value by means of control of said current shunt by a deviation signal received from said comparator.

14. A radar level gauge according to claim 13, wherein said deviation signal is sent from the comparator to the current shunt via second optical coupling devices.

15. A method for non-conductively transferring power from a two-wire process control loop to a radar level gauge for measuring the level of a product in a tank and for non-conductively transmitting information from said gauge to said loop, the method comprising the steps of:

directing an antenna unit into the tank, sending by means of a lower power microwave source a microwave signal through the antenna unit into the tank, receiving by means of a low power receiver a microwave signal reflected from a surface of the product in the tank, initiating transmission of the microwave signal and determining product level based upon the received signal in a measurement circuit coupled to the source and the receiver, transmitting information related to product level over the loop via an output circuitry situated in the radar level gauge and coupled to the two-wire process control loop, supplying power from the loop for providing a power supply circuitry being the sole source of power for the low power microwave source, the low power microwave receiver, the measurement circuitry and the output circuitry in the radar level gauge, non-conductively transferring power from the loop to the power supply circuitry, inductively coupling said loop with said radar level gauge circuitry for the transfer of said power, and non-conductively transmitting said information between the output circuitry and said loop.

16. A method according to claim 15, comprising the step optically coupling said loop to the output circuitry of the radar level gauge.

17. A method according to claim 15, comprising the step optically coupling said loop to a process control signal receiving device of the radar level gauge for the control of said gauge.

* * * * *